Dec. 30, 1969 YUTAKA FURUSAWA ET AL 3,486,865

CONTINUOUS POLYMERIZATION APPARATUS

Filed Nov. 1, 1967

INVENTORS:
YUTAKA FURUSAWA
ETSUO OTOHATA
BY
Charles E. Miller
AGENT

United States Patent Office 3,486,865
Patented Dec. 30, 1969

3,486,865
CONTINUOUS POLYMERIZATION APPARATUS
Yutaka Furusawa and Etsuo Otohata, Mihara, Japan, assignors to Teijin Limited, Osaka, Japan, a corporation of Japan
Filed Nov. 1, 1967, Ser. No. 679,781
Int. Cl. B01j 3/02
U.S. Cl. 23—285    11 Claims

ABSTRACT OF THE DISCLOSURE

A continuous polymerization apparatus having a cylindrical chamber which is compartmentalized by one or bore generally transverse partitions, which partitions can be foraminous and which are symmetrically mounted upon and adapted to rotate with a rotary shaft situated on the longitudinal axis of the cylindrical chamber. Transverse stirring vanes and longitudinal stirring vanes connecting the partition peripheries provide effective lateral agitation and thermal uniformity without impairing plug flow of the reactants.

---

The present invention relates to polymerization apparatuses. More particularly, it relates to an apparatus for conducting continuous polymerization reactions wherein uniform temperatures, plug flow, and effective lateral mixing are attained.

Apparatuses for conducting continuous polymerization reactions can be classified as either tank-type or tower-type. In the former category, the attainment of the desirable effects of "plug-flow" and lateral mixing (i.e., agitation which results in a homogeneous distribution of reactants in a direction perpendicular to the direction of plug flow) is generally sought by the use of propellers or rotary vanes. However, due to various inadequacies in the design of such apparatuses, these conditions are seldom realized, with the result that localized regions of unreacted materials ("dead spaces") occur with corresponding reduction in the rate of conversion. This difficulty can be offset to some extent by combining a plurality of tank-type polymerization apparatuses in series but at increased operating expense.

In the case of tower-type polymerization vessels, the slimness of the tank compared to its length affords a satisfactory plug flow with consequent high conversion, but at the expense of poor lateral mixing and less effective temperature control. Thus, it is difficult, for example, to obtain highly uniform dispersions of additives within the polymer-forming reactants using column-type polymerization vessels.

Therefore, it is an object of the present invention to provide an improved continuous polymerization apparatus.

Another object is to provide a unitary, continuous polymerization apparatus which affords satisfactory plug flow, uniform reaction temperature, and effective lateral mixing.

Other objects and a fuller understanding of the present invention may be had by referring to the following description and claims.

According to the present invention, there is provided a cylindrical, vertical-flow polymerization vessel suitable for the production of polymers such as polyamides whose interior region is divided into a plurality of compartments by means of one or more partitions or barrier walls having generally circular peripheries, which walls are preferably equidistant and adapted to rotate within the cylindrical vessel by virtue of their being mounted upon a rotary shaft which coincides with the axis of the vessel. Communication between adjacent compartments is made possible by virtue of the clearance between the periphery of the barrier walls and the inner wall of the cylindrical vessel. It is preferred that such clearance be as small as possible consistent with the mechanical requirement that the barrier wall be rotatable within the reaction vessel and with certain criteria relating the cross-sectional area of the reaction vessel with the amount of communication between adjacent compartments, which criteria are more fully described hereinbelow.

While not required for the successful operation of the apparatus of the invention, it is desirable to have additional communication between adjacent compartments by using barrier walls which are foraminous, i.e., having one or more perforations or foramina therein to permit the facile passage therethrough of the reaction medium. The foramina may have any shape consistent with their function as passageways, although a circular shape is preferred for ease of fabrication. It is also highly advantageous for the foramina to be symmetrically disposed in relation to the rotary shaft to avoid any undue wear on shaft bearings.

It is a feature of this invention that the ratio of the area of communication between adjacent compartments, i.e., the total area of the foramina plus the area of clearance between the vessel wall and periphery of the barrier wall, to the cross-sectional area of the reaction vessel be no greater than about 0.10. When, for example, the apparatus of the present invention is employed for the polymerization of epsicon-caprolactam, the value of the aforesaid ratio (hereinafter termed the "opening ratio") lies preferably between about 0.005 and about 0.05.

In accordance with the present invention, the barrier walls may be either disc-shaped, i.e., planar, or , alternatively they may be conical-shaped as shown in FIGURES 6A, 6B and 7A, 7B of the drawings. Particular advantages of conical-shaped barrier walls include the avoidance of gas bubble accumulations on the undersides of the barrier walls as well as facile drainage of the reaction vessel following shutdown thereof. In this connection, when barrier walls are employed which have the shape of a cone with the flared portion extending upward, it is especially preferred that each such barrier wall have a foramen at the center (apex) thereof to avoid the entrapment of reactant. As shown in the drawings, the centrally located foramen can be circular so as to give the barrier wall the appearance of a conical frustum.

It is a further aspect of the present invention that the apparatus is equipped with at least two stirring vanes, desirably an even number thereof and preferably two thereof, symmetrically disposed about the vertical axis of the reaction vessel, in a generally vertical manner along the length of the reaction vessel so as to intersect (and preferably be secured to) each barrier wall at its periphery. Upon rotation of the shaft and the barrier walls attached thereto, these vertical vanes revolve about the axis of the vessel, and in so doing they described a cylinder of slightly smaller diameter than and concentric with the cylindrical reaction vessel. The leading edge of each vane is so disposed as to drive the material swept thereby inwardly toward the center of the reaction vessel.

In addition to the aforementioned vertical stirring vanes, it is a further feature of the novel apparatus of the present invention to have at least one stirring vane disposed horizontally (i.e., transverse to the axis of the reaction vessel), and which preferably intersects the axis of the reaction vessel. Each of these transverse stirring vanes is in abutment with and preferably secured to a vertical stirring vane at the outer termini of said transverse vanes. According to a preferred mode of the present invention, the number and disposition of such transverse stirring vanes is such that each barrier wall, particularly a planar barrier wall, has a vane mounted on its upper surface and another vane mounted on its lower surface (cf. FIGURE 1 of the drawings). Alternatively, according to another preferred mode of the invention, the transverse stirring vanes may be distributed within the apparatus so that each pair of adjacent barrier walls has a transverse stirring vane disposed intermediate of the barrier walls and preferably equidistant therebetween (cf. FIGURE 3 of the drawings).

The vertical stirring vanes and the transverse stirring vanes are adapted to function as structural support members as well as stirring members, so that upon rotation of the axially located shaft, the barrier walls, vertical vanes and transverse vanes are caused to rotate in response thereto as a rigid, unitary rotor assembly. Methods of joining and securing the various structural members of the rotor assembly to one another at their points of contact include any of those techniques commonly used in accordance with the materials of construction and requirements for strength and rigidity, e.g., welding, riveting, threadable engagement, and the like.

The thickness and width of the vertical and transverse stirring vanes is not critical to the design of the apparatus of the present invention. As a general rule, however, when constructing an apparatus of the present invention, the stirring vanes are made as thin as possible consistent with the requirements for mechanical rigidity under the conditions of intended use. By virtue of the concerted action of the vertical and transverse stirring vanes together with the rotation of the barrier walls, uniform and thorough lateral agitation, reaching to all regions of the reaction vessel, is obtained to effectively eliminate "dead spaces" and achieve uniform temperatures within the vessel without sacrificing plug flow.

It is preferred that all of the features of the invention hereinbefore described be used in combination. For example, the omission of barrier walls from the apparatus of the invention significantly reduces the degree of plug flow and uniformity of mixing within the reaction chamber. Omission of either the vertical stirring vanes or transverse stirring vanes or both results in diminished uniformity of heating and of lateral mixing with concomitant increase in the probability of formation of "dead spaces."

In the apparatus of the present invention it has been found that the desired plug-flow characteristics of material moving through the reaction vessel are improved as the distance between adjacent barrier walls is made smaller. However, this beneficial result of bringing adjacent barrier walls closer together is somewhat offset by the decreased efficiency of lateral mixing with decreased spacing of the barrier walls. A desirable compromise between these two opposing effects can generally be effected by arranging the barrier walls within the reaction vessel so that the ratio of the distance between corresponding points on adjacent barriers to the inner diameter of the reaction vessel lies between about 0.25 and about 1.25, and preferably between about 0.5 and about 0.75. For the polymerization of epsilon-caprolactam, a value of about 0.5 for this ratio is especially preferred.

Consequently, whereas the plug flow of the reaction mixture in the vessel is improved by increasing the number of barrier walls, from the practical standpoint, however, the total number of barrier discs in any given polymerization apparatus of the present invention will depend on the size (i.e., height) of the reaction vessel which in turn is governed by the scale of the operation.

Materials suitable for fabricating the apparatus of the present invention may be of any type provided the following two conditions are met: (1) inertness of the materials of construction to the reaction conditions within the vessel; and (2) adequate mechanical strength, viz, ability of the reaction vessel to contain pressures normally developed therein and structural rigidity and strength of the rotary shaft, barrier walls, vertical vanes and transverse vanes comprising the rotor assembly of the present invention. Specific examples of suitable materials of construction include stainless steel and the like.

A further understanding of the invention may be had by reference to the accompanying drawings wherein:

FIGURES 4A and 4B through FIGURES 7A and 7B are, respectively, plan views and corresponding cross-sectional views of several preferred barrier discs according to the present invention.

Figure 1:
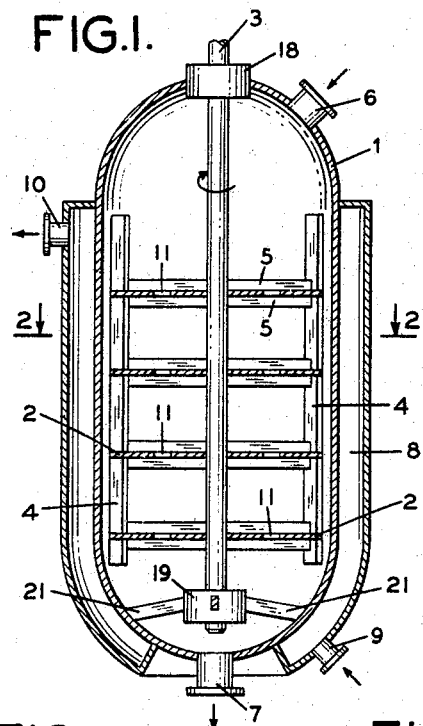
FIGURE 1 is a vertical view in section of a preferred embodiment of the polymerization vessel and rotor assembly of the present invention.
Figure 2:
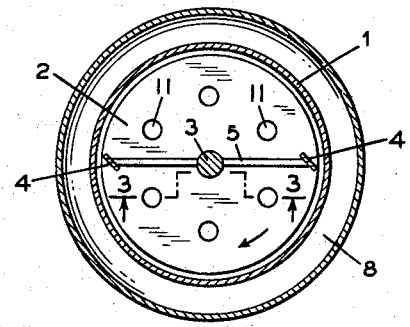
FIGURE 2 is a sectional view taken along the line 2—2 of FIGURE 1.

Referring to FIGURES 1 and 2, vertical, cylindrical reaction vessel 1 is divided into a plurality of compartments by planar, horizontal barrier walls 2 having therein foramina 11 and mounted upon power-driven shaft 3 (motor not shown) which is constrained to rotate coincidentally with the axis of reaction vessel 1 by means of bearing members 18 and 19. Bearing member 19 is rigidly mounted in place by means of bracing members 21 which are of a design such as not to interfere with the passage of material through vessel 1. Vertical stirring vanes 4 communicate between the peripheries of barrier walls 2 and are attached to stirring vanes 5 which are mounted on the upper and lower surfaces of each barrier wall 2. Reactants are introduced into reaction vessel 1 through inlet port 6, and product polymer is discharged through outlet port 7. Reaction vessel 1 is also shown equipped with a conventional heating jacket 8 into which a fluid heating medium may be introduced through inlet 9 and from which the fluid medium may be withdrawn through outlet 10. Reaction vessel 1 can be adapted by conventional means (not shown) to contain any suitable atmosphere (e.g. steam) under pressures less than, equal to, or greater than atmospheric pressure.

Figure 3:
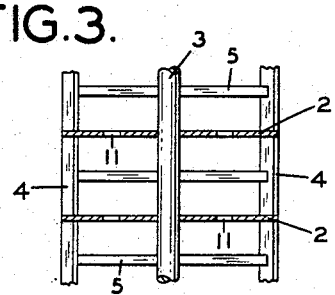
FIGURE 3 is a vertical view in section of another preferred rotor assembly according to the present invention.

Referring to FIGURE 3, a vertical sectional view is shown of a variant of the rotor assembly of FIGURE 1. The stirring vanes 5 are arranged intermediately between adjacent foraminous barrier walls 2 to bridge the opposed vertical stirring vanes 4.

Figure 4A:
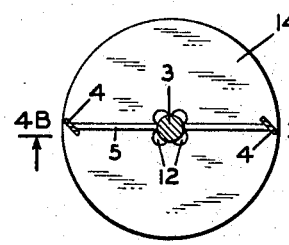
Figure 4B:
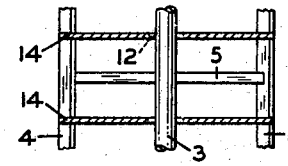

Referring to FIGURES 4A and 4B, foramina 12 are symmetrically disposed on barrier wall 14 near the intersection of shaft 3 with barrier disc 14.

Figure 5A:
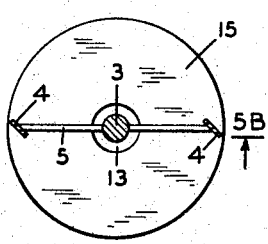
Figure 5B:
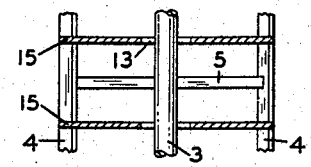

Referring to FIGURES 5A and 5B, barrier disc 15 is made foraminous by virtue of the circular cut-out 13 which is concentric with the axis of shaft 3.

Figure 6A:
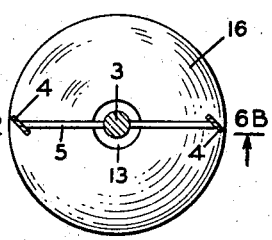
Figure 6B:
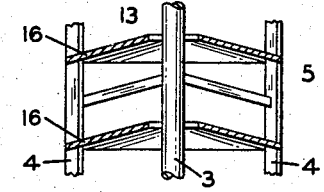

Referring to FIGURES 6A and 6B, barrier wall 16 is of the nature of a conical frustum whose upper (smaller) base is delineated by circular foramen 13 which is concentric with the axis of shaft 3.

Figure 7A:
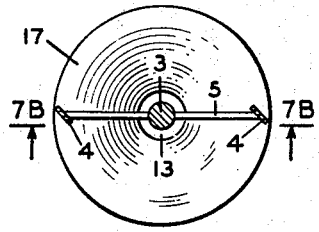
Figure 7B:
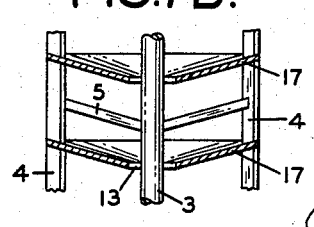

Referring to FIGURES 7A and 7B, barrier wall 17 is of the nature of a conical frustum whose lower (smaller) base is delineated by circular foramen 13 which is concentric with the axis of shaft 3.

The following examples are presented for the purpose of illustrating the construction and operation of the present invention. The apparatus of the invention is particularly suited for the production of polyamides and especially for the polymerization of epsilon-caprolactam to form nylon-6.

In the examples, the quality of the product polymers are evaluated in terms of their hot-water extractables content and intrinsic viscosity. By "hot-water extractables" are meant those constituents of the polymer product (viz, monomers and oligomers) which can be leached out with water at about 100° C. Intrinsic viscosity, $\eta_{int}$, is a physical property of a polymer which is calculated from measurements made on a solution of the polymer at fixed concentration and temperature. Intrinsic viscosity is defined by the following relationship:

$$\eta_{int} = \frac{2.303}{C} \log_{10} \eta_{rel}$$

wherein:

C = concentration (in grams per milliliter) of the polymer in the test solution; and $\eta_{rel}$ = ratio of the viscosity coefficient of the polymer test solution (at a concentration of C) to the viscosity coefficient of the solvent.

In the examples, C has a value of 0.005 gram per milliliter; relative viscosities ($\eta_{rel}$) are measured at 35° C. using metacresol as the solvent.

Percentages are by weight unless outherwise indicated.

EXAMPLE I

Epsilon-caprolactam is continuously polymerized within an apparatus according to the present invention at a temperature therein of about 275° C. and under a pressure of about 2 kilograms per square centimeter above atmospheric pressure. The reaction pressure is maintained by means of an atmosphere of steam. The inner diameter of the apparatus is 200 millimeters; four planar, equidistant barrier walls, each having a diameter of 198 millimeters and thickness of 3 millimeters, are mounted on a shaft which is 20 millimeters in diameter and axially positioned within the reaction chamber. The distance between adjacent barrier walls is 100 millimeters. Each of the barrier walls has a pattern of four identical, quasi-circular foramina as shown in FIGURE 4A. Each of the foramina has a diameter of 8 millimeters and is centered on the intersection of the shaft with the barrier wall. The average residence time of the reaction mixture within the apparatus is about 8 hours with the shaft rotating at 30 revolutions per minute. The resultant polymer has the following properties; hot-water extractables content = 13.5%; $\eta_{int}$ = 0.85.

EXAMPLE II

Using the same polymerization apparatus as in Example I, epsilon-caprolactam is polymerized at a steam pressure of about 0.5 kilogram per square centimeter above atmospheric pressure, all other conditions remaining the same as in Example I. After a residence time within the reactor of about 18 hours, the polymer product exhibits a hot-water extractables content of about 11.0% and $\eta_{int}$ = 1.15.

As already indicated, the above examples are presented for the purpose of illustrating the apparatus of the present invention as applied to the continuous polymerization of epsilon-caprolactam. It is to be understood, of course, that departures may be made from the mechanical specifications recited in these examples, and changes and variations may be made in the mode of operation, reaction conditions, and types of materials polymerized without departing from the scope of the present invention as defined in the following claims.

We claim:

1. A continuous polymerization apparatus comprising:
   (a) a generally vertical, cylindrical chamber;
   (b) a rotary shaft coincident with the vertical axis of the cylindrical chamber;
   (c) at least one barrier wall symmetrically and equidistantly mounted upon the rotary shaft to partition the cylindrical chamber into a plurality of compartments, said barrier wall being further characterized by having a generally circular circumference smaller than the inner circumference of the cylindrical chamber (a) and being adapted to rotate conjointly with said rotary shaft within the cylindrical chamber in a plane generally perpendicular to the rotary shaft;
   (d) at least two stirring vanes symmetrically disposed about the vertical axis of the rotary shaft and communicating between the barrier walls at the peripheries thereof, each of said vanes being further characterized by having the leading edge thereof more distant from the rotary shaft than the trailing edge; and
   (e) at least one stirring vane perpendicularly intersecting the rotary shaft and having each terminus in abutment with a vane (d).

2. An apparatus according to claim 1 wherein:
   a plurality of barrier walls are present;
   the ratio of the area of communication between adjacent compartments to the cross-sectional area of the cylindrical chamber is less than about 0.10; and
   the ratio of the distance between adjacent barrier walls to the diameter of the chamber is between about 0.25 and about 1.25.

3. An apparatus according to claim 1 wherein:
   the barrier wall (c) is in the form of a conical frustum, the axis whereof is coincident with the vertical axis of the cylindrical chamber, said conical frustum being further characterized in that the minor base thereof is formed by a circular foramen.

4. An apparatus according to claim 3 wherein the conical frustum-shaped barrier wall is disposed with the minor base thereof at a higher elevation than the major base.

5. An apparatus according to claim 3 wherein the conical frustum-shaped barrier wall is disposed with the minor base thereof at a lower elevation than the major base.

6. An apparatus according to claim 1 wherein:
   the barrier wall (c) is a disc; and
   the stirring vanes (d) are two in number and are generally vertical.

7. An apparatus according to claim 6 wherein:
   the ratio of the area of communication between adjacent compartments to the cross-sectional area of the cylindrical chamber is between about 0.005 and about 0.05; and
   the ratio of the distance between adjacent barrier walls to the diameter of the chamber is about 0.5.

8. An apparatus according to claim 7 wherein:
   the barrier wall (c) contains at least one foramen symmetrically disposed with respect to the rotary shaft (b); and
   the barrier wall (c) has one stirring vane (e) disposed in contact with and perpendicular to the upper face of the barrier wall (c), and one stirring vane (e) disposed in contact with and perpendicular to the lower face of the barrier wall (c).

9. An apparatus acording to claim 8 wherein the barrier wall (c) contains a plurality of circular foramen symmetrically disposed with respect to the rotary shaft (b).

10. An apparatus according to claim 7 wherein:
    the barrier wall (c) contains at least one foramen symmetrically disposed with respect to the rotary shaft (b); and
    each stirring vane (e) is disposed equidistantly between two adjacent barrier walls (c).

11. An apparatus according to claim 10 wherein:
    the barrier wall (c) contains a plurality of circular foramina symmetrically disposed with respect to the rotary shaft (b).

References Cited

UNITED STATES PATENTS

| | | |
|---|---|---|
| 1,420,650 | 6/1922 | Mabee. |
| 1,587,115 | 6/1926 | Govers _____ 23—285 XR |
| 2,073,026 | 3/1937 | Renfrew et al. |
| 2,838,107 | 6/1958 | Bridges et al. |
| 2,973,341 | 2/1961 | Hippe et al. _____ 23—285 X |
| 3,031,273 | 4/1962 | Latinen _____ 23—285 |
| 3,046,099 | 7/1962 | Willey _____ 23—285 |
| 3,248,180 | 4/1966 | Kilpatrick _____ 23—285 |
| 3,279,894 | 10/1966 | Tate et al. _____ 23—285 |

MORRIS O. WOLK, Primary Examiner

B. S. RICHMAN, Assistant Examiner

U.S. Cl. X.R.

159—6; 260—78